US010102782B1

(12) United States Patent
Konshin

(10) Patent No.: US 10,102,782 B1
(45) Date of Patent: Oct. 16, 2018

(54) ROAD SIDE VEHICLE DISTRESS SIGN

(71) Applicant: Roman Konshin, Apple Valley, MN (US)

(72) Inventor: Roman Konshin, Apple Valley, MN (US)

( * ) Notice: Subject to any disclaimer, the term of this patent is extended or adjusted under 35 U.S.C. 154(b) by 0 days.

(21) Appl. No.: 15/496,181

(22) Filed: Apr. 25, 2017

(51) Int. Cl.

| | |
|---|---|
| ***B60Q 1/52*** | (2006.01) |
| ***G09F 13/04*** | (2006.01) |
| ***G09F 15/00*** | (2006.01) |
| ***G09F 21/04*** | (2006.01) |
| ***G09F 7/18*** | (2006.01) |
| ***G09F 13/00*** | (2006.01) |
| ***G09G 5/00*** | (2006.01) |
| ***G09G 5/22*** | (2006.01) |
| ***G09G 5/10*** | (2006.01) |
| ***G06F 3/02*** | (2006.01) |

(52) U.S. Cl.
CPC ............ *G09F 13/0413* (2013.01); *G06F 3/02* (2013.01); *G09F 7/18* (2013.01); *G09F 13/005* (2013.01); *G09F 15/0056* (2013.01); *G09F 21/048* (2013.01); *G09G 5/006* (2013.01); *G09G 5/10* (2013.01); *G09G 5/22* (2013.01); *G09F 2007/1852* (2013.01); *G09F 2007/1865* (2013.01); *G09F 2013/044* (2013.01); *G09F 2013/0463* (2013.01); *G09F 2021/041* (2013.01); *G09G 2330/02* (2013.01); *G09G 2354/00* (2013.01)

(58) Field of Classification Search
CPC ...... G09F 13/0413; G09F 13/005; G09F 7/18; G09F 21/048; G09F 15/0056; G09F 2013/0463; G09F 2007/1865; G09F 2007/1852; G09F 2021/041; G09F 2013/044; G06F 3/02; G09G 5/10; G09G 5/22; G09G 5/006; G09G 2354/00; G09G 2330/02
See application file for complete search history.

(56) References Cited

U.S. PATENT DOCUMENTS 3,274,548 A 9/1966 Brimsek
4,192,090 A * 3/1980 Seth ......................... B60Q 7/00 340/472
4,328,481 A 5/1982 Sexton
4,922,223 A * 5/1990 Prevot .................... B60Q 1/503 340/321
5,606,309 A 2/1997 Smith
(Continued)

FOREIGN PATENT DOCUMENTS

WO 2000007845 A1 8/1998

*Primary Examiner* — Ibrahim A Khan

(57) ABSTRACT

The road side vehicle distress sign is adapted for use with a vehicle. The road side vehicle distress sign attaches to the vehicle. The road side vehicle distress sign is a sign that presents a sentiment indicating that the vehicle requires assistance. The sentiment presented by the road side vehicle distress sign is selected from a plurality of sentiments such that a selected sentiment informs passing vehicles of the type of assistance the vehicle requires. The road side vehicle distress sign attaches to the vehicle. The selected sentiment presented by the road side vehicle distress sign is illuminated such that the selected sentiment is readily visible to passing vehicles. The road side vehicle distress sign comprises a housing and a placard device. The placard device is contained within the housing.

8 Claims, 6 Drawing Sheets

(56) References Cited

U.S. PATENT DOCUMENTS

| | | | | |
|---|---|---|---|---|
| 6,273,597 | B1 | 8/2001 | Rolack | |
| 6,707,389 | B2 | 3/2004 | Pederson | |
| 6,963,275 | B2 | 11/2005 | Smalls | |
| D573,499 | S | 7/2008 | King | |
| 9,160,186 | B2 * | 10/2015 | Alessandro | H02J 7/0052 |
| 2003/0160690 | A1 | 8/2003 | Baldwin | |
| 2006/0262528 | A1 * | 11/2006 | Hall | B60Q 1/52 362/227 |
| 2010/0072334 | A1 * | 3/2010 | Le Gette | F16M 13/00 248/176.3 |
| 2017/0140683 | A1 * | 5/2017 | Wright | G09F 21/048 |

* cited by examiner

ROAD SIDE VEHICLE DISTRESS SIGN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles in general, more specifically, the arrangement of a portable emergency signaling device on a vehicle.

SUMMARY OF INVENTION

The road side vehicle distress sign is adapted for use with a vehicle. The road side vehicle distress sign attaches to the vehicle. The road side vehicle distress sign is a sign that presents a sentiment indicating that the vehicle requires assistance. The sentiment presented by the road side vehicle distress sign is selected from a plurality of sentiments such that a selected sentiment informs passing vehicles of the type of assistance the vehicle requires. The road side vehicle distress sign attaches to the vehicle. The selected sentiment presented by the road side vehicle distress sign is illuminated such that the selected sentiment is readily visible to passing vehicles. The road side vehicle distress sign comprises a housing and a placard device. The placard device is contained within the housing.

These together with additional objects, features and advantages of the road side vehicle distress sign will be readily apparent to those of ordinary skill in the art upon reading the following detailed description of the presently preferred, but nonetheless illustrative, embodiments when taken in conjunction with the accompanying drawings.

In this respect, before explaining the current embodiments of the road side vehicle distress sign in detail, it is to be understood that the road side vehicle distress sign is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the road side vehicle distress sign.

It is therefore important that the claims be regarded as including such equivalent construction insofar as they do not depart from the spirit and scope of the road side vehicle distress sign. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
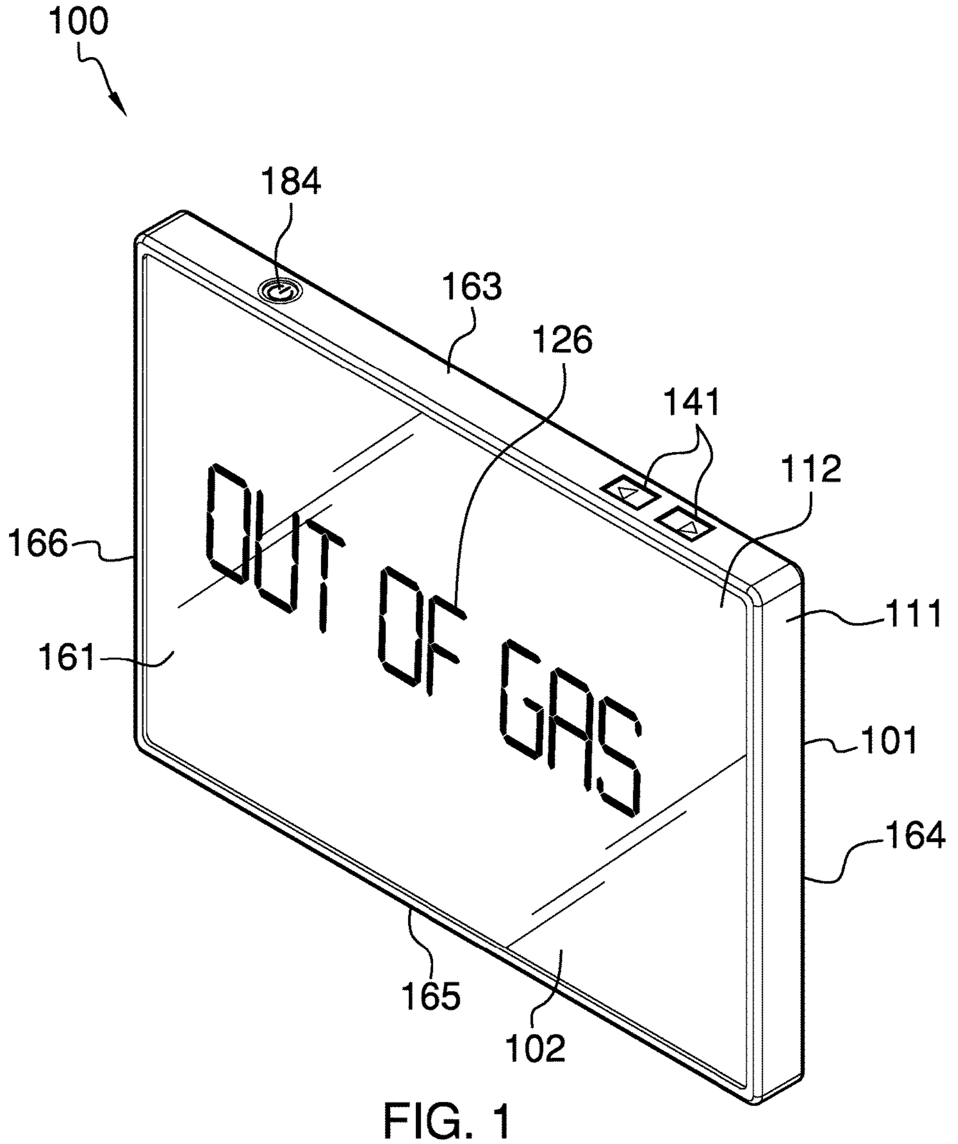
FIG. 1 is a perspective view of an embodiment of the disclosure.
Figure 2:
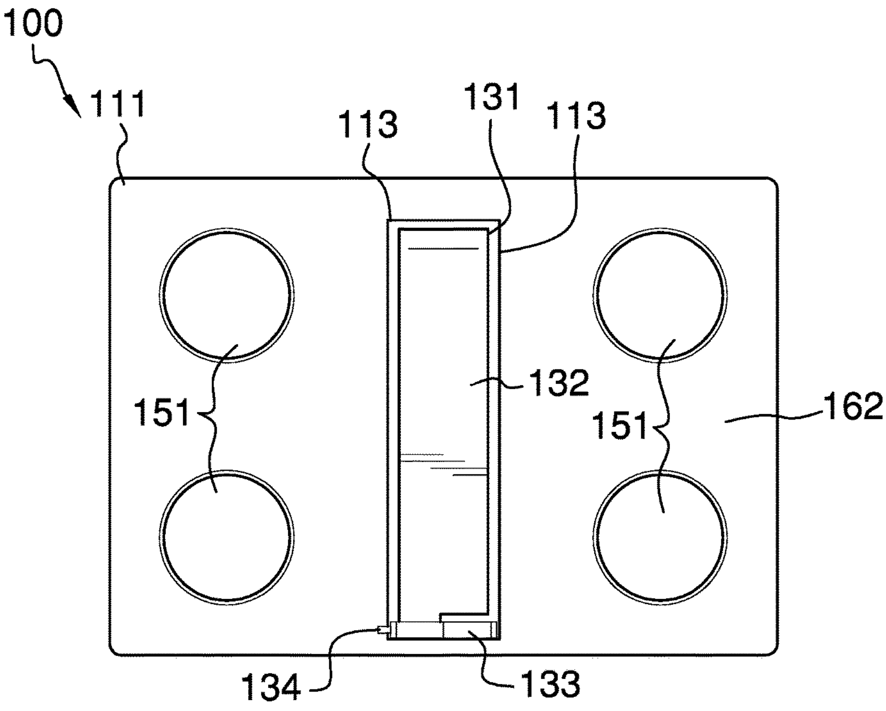
FIG. 2 is a rear view of an embodiment of the disclosure.
Figure 3:
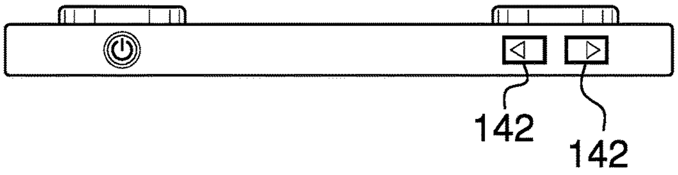
FIG. 3 is a top view of an embodiment of the disclosure.
Figure 4:
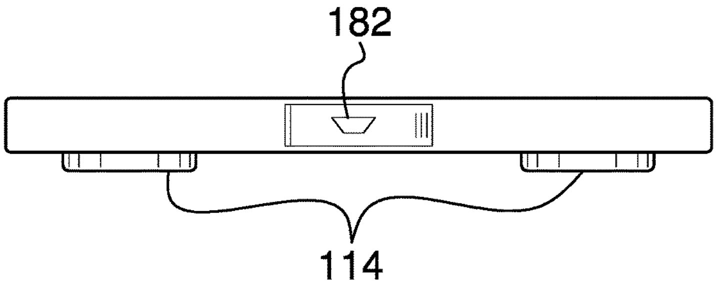
FIG. 4 is a bottom view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

The road side vehicle distress sign is adapted for use with a vehicle. The road side vehicle distress sign attaches to the vehicle. The road side vehicle distress sign is a sign that presents a sentiment indicating that the vehicle requires assistance. The sentiment presented by the road side vehicle distress sign is selected from a plurality of sentiments such that a selected sentiment informs passing vehicles of the type of assistance the vehicle requires. The road side vehicle distress sign attaches to the vehicle. The selected sentiment presented by the road side vehicle distress sign is illuminated such that the selected sentiment is readily visible to passing vehicles. The road side vehicle distress sign comprises a housing and a placard device. The placard device is contained within the housing.

Detailed reference will now be made to one or more potential embodiments of the disclosure, which are illustrated in FIGS. 1 through 8.

The road side vehicle distress sign 100 (hereinafter invention) is adapted for use with a vehicle 172. The invention 100 attaches to the vehicle 172. The vehicle 172 refers to a motorized device that transports cargo and passengers over a road network. The invention 100 is a sign that presents a sentiment 126 indicating that the vehicle 172 requires assistance. The sentiment 126 presented by the invention 100 is selected from a plurality of sentiments such that a selected sentiment 126 informs a passing vehicle 172 of the type of assistance the vehicle 172 requires. The invention 100 attaches to the vehicle 172. The selected sentiment 126 presented by the invention 100 is illuminated such that the selected sentiment 126 is readily visible to the passing vehicle 172. The invention 100 comprises a housing 101 and a placard device 102. The placard device 102 is contained within the housing 101.

The sentiment 126 is a symbolic version of a message that conveys to passing vehicles: 1) that the vehicle 172 is in distress; and, 2) the nature of the vehicle's 172 distress. The message of a sentiment 126 selected from the plurality of sentiments will include, but is not limited to, "Out of Gas", "Flat Tire", "Accident", "Need Jump" or "Mechanical Issue.".

The housing 101 is a casing within which the placard device 102 is contained. The housing 101 is formed with a display aperture 112 as well as all other apertures and form factors necessary to allow the housing 101 to accommodate the use and operation of the invention 100. The housing 101 comprises a shell 111, a display aperture 112, a stand 113, and a plurality of attachment devices 114.

The shell 111 comprises a first face 161, a second face 162, a third face 163, a fourth face 164, a fifth face 165, and a sixth face 166. The first face 161 is the surface of the shell 111 within which the display aperture 112 is formed. The second face 162 is the surface of the shell 111 that is distal from the first face 161. The third face 163 is a surface of the shell 111 that attaches the first face 161 to the second face 162. The fourth face 164 is a surface of the shell 111 that attaches the first face 161 to the second face 162. The fifth face 165 is a surface of the shell 111 that attaches the first face 161 to the second face 162. The sixth face 166 is a surface of the shell 111 that attaches the first face 161 to the second face 162.

The shell 111 is a rigid casing within which the placard device 102 is physically contained. The shell 111 has a rectangular block structure. The display aperture 112 is an opening formed in the shell 111 such that the sentiment 126 is projected in a visible manner through the display aperture 112 by the placard device 102. The display aperture 112 is further formed with inner dimensions. The display aperture 112 is formed in the first face 161 of the shell 111. The plurality of attachment devices 114 are a collection of fastening devices that are used to attach the invention 100 directly to a vehicle 172.

The stand 113 is a structure that is attached to the exterior surface of the second face 162 of the shell 111. The stand 113 is an extendable structure that supports the shell 111 in such a manner that the invention 100 can be deployed in a self-standing manner. The stand 113 comprises a cavity 131, an arm 132, a hinge 133, and a detent 134.

The cavity 131 is a negative space that is formed in the second face 162 of the shell 111. The cavity 131 is sized such that the arm 132 will fit in a flush manner within the cavity 131. The arm 132 is a rectangular plate structure. The arm 132 is sized such that the arm 132 will fit in a flush manner within the cavity 111 when the stand 113 is not in use. The hinge 133 is a mechanical device that attaches the arm 132 to the second face 162 of the shell 111 such that the arm 132 will rotate into and out of the cavity 131. In the first potential embodiment of the disclosure, the detent 134 is a mechanical device that locks the hinge 133 in a fixed position such that the position of the arm 132 relative to the second face 162 of the shell 111 is fixed.

Figure 5:
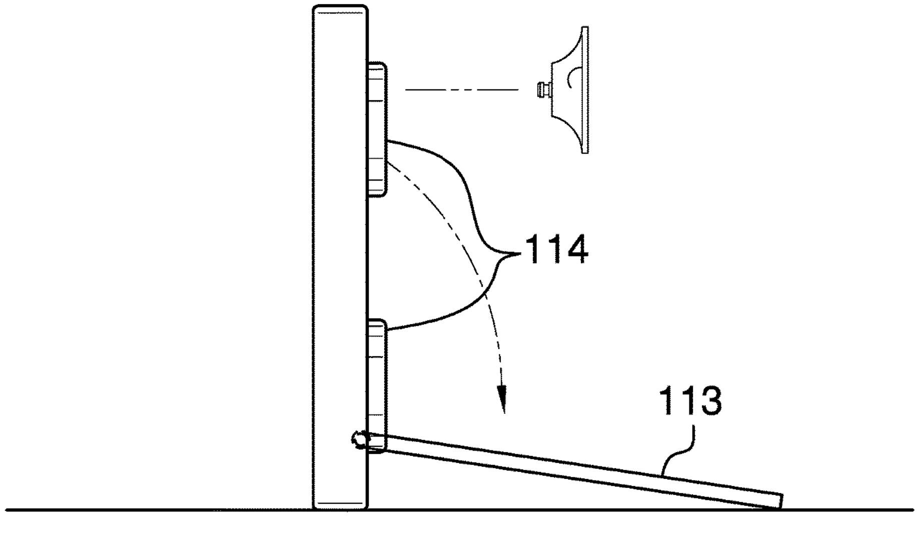
FIG. 5 is a side view of an embodiment of the disclosure.
Figure 6:
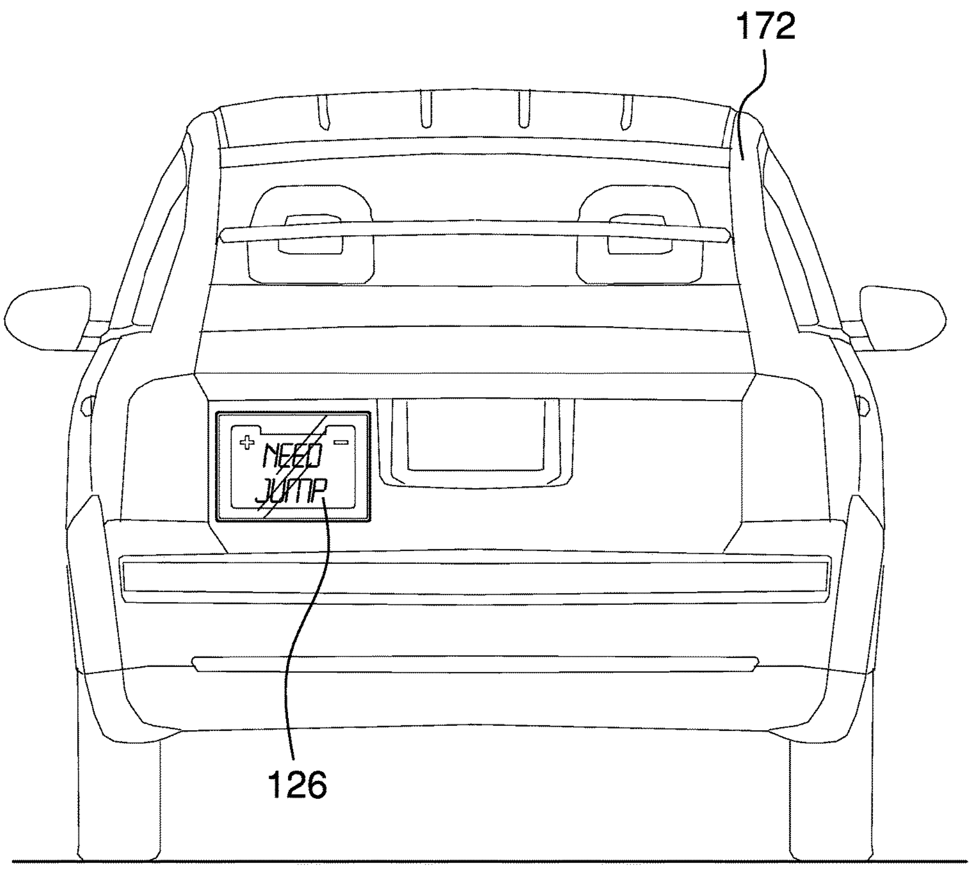
FIG. 6 is an in-use view of an embodiment of the disclosure.
Figure 7:
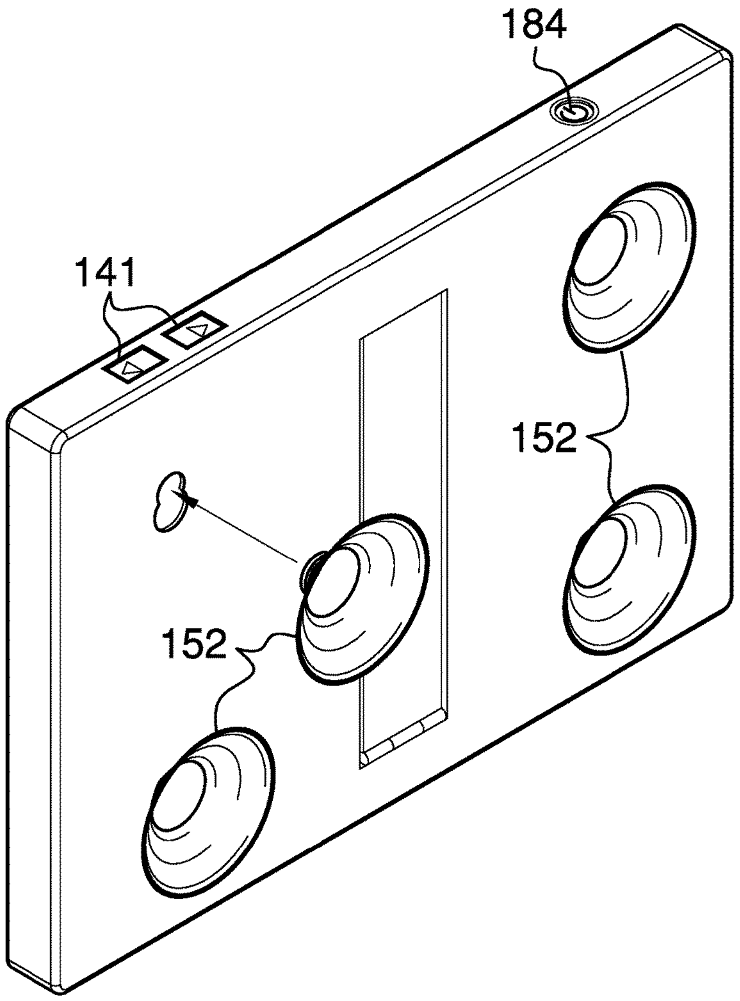
FIG. 7 is a perspective view of an embodiment of the disclosure.
Figure 8:
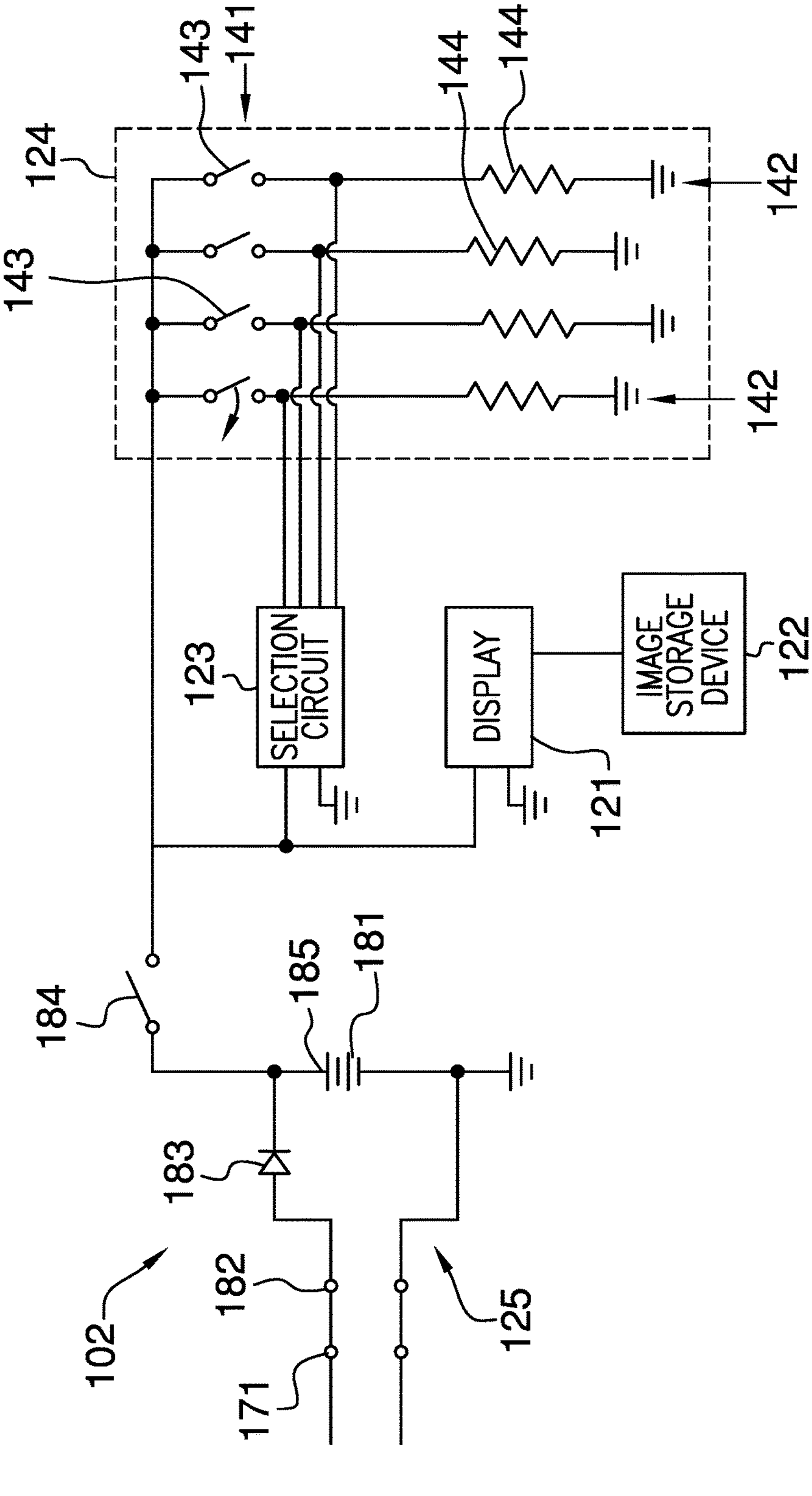
FIG. 8 is a block diagram of an embodiment of the disclosure.

As shown most clearly in FIG. 5, the locking the arm 132 in a set position, the arm 132 can be used to support the invention 100 such that the invention 100 can be used as a self-standing sign. In the first potential embodiment of the disclosure, the hinge 133 and the detent 134 are combined within a commercially available locking hinge 133.

The placard device 102 is an electrical device that presents an illuminated sentiment 126 selected from a plurality of sentiments. The placard device 102 interacts with a user through an interface 124 to select or change the selection of the sentiment 126 from the plurality of sentiments. The placard device 102 comprises a display 121, an image storage device 122, a selection circuit 123, an interface 124, and a power system 125. The display 121 is further defined with an outer dimension.

The display 121 is a commercially available electronic device that presents an image that conveys the selected sentiment 126. The display 121 is a backlit device that illuminates the selected sentiment 126. The illumination of the selected sentiment 126 improves the visibility of the selected sentiment 126 in low light or other poor visibility condition. The inner dimension of the display aperture 112 is lesser than the outer dimensions of the display 121 such that the display 121 is contained within the shell 111.

The image storage device 122 is a commercially available electronic device that stores a digital representation of each sentiment 126 contained within the plurality of sentiments. The image storage device 122 may be controlled by either the display 121 or the selection circuit 123 depending on the engineering decisions made in the implementation of the specific embodiment of the disclosure.

The selection circuit 123 is an electrical circuit that: 1) receives input signals from the interface 124; and, 2) based on the input signals received from the interface 124 selects a sentiment 126 from the plurality of sentiments for presentation on the display 121.

The interface 124 is an electrical device that allows for the external identification and selection of a sentiment 126 from the plurality of sentiments. In the first potential embodiment of the disclosure, the interface 124 comprises a plurality of display switches 141. The plurality of display switches 141 comprises a collection of individual display switches 142. Each individual display switch 142 comprises a selection switch 143 and a pull-down resistor 144.

Each individual display switch 142 is an electric circuit that is individually monitored by the selection circuit 123. When the individual display switch 142 is actuated the selection circuit 123 interprets the actuation as a specific identification of a sentiment 126 selected from the plurality of sentiments. The selection switch 143 is a readily and commercially available maintained switch. The pull-down resistor 144 is a readily and commercially available electrical component. The selection switch 143 and the pull-down resistor 144 form a series circuit between the positive terminal 185 of the battery 181 and the electrical ground 145. The pull-down resistor 144 is placed between the selection switch 143 and the electrical ground 145. The individual display switch 142 is formed such that when the selection switch 143 is closed, a voltage is presented across the pull-down resistor 144.

The selection circuit 123 detects the presented voltage. The selection circuit 123 generates the appropriate output signal required to present the indicated selected sentiment 126 on the display 121 based on the detected voltage. Methods to form electric circuits such as those described above are well known and documented in the electrical arts.

The power system 125 is an electrical circuit that powers the operation of the placard device 102. The power system 125 comprises a battery 181, a charging port 182, a diode 183, and a master switch 184.

The battery 181 is a commercially available rechargeable battery 181. The master switch 184 is a readily and commercially available maintained switch that is placed in series with the positive terminal 185 of the battery 181 such that the master switch 184 acts as the on off switch for the invention 100. The positive terminal 185 refers to the cathode of the battery 181 when the battery 181 is discharging.

The chemical energy stored within the battery 181 is renewed and restored through use of the charging port 182. The charging port 182 is an electrical circuit that reverses the polarity of the battery 181 and provides the energy necessary to reverse the chemical processes that the battery 181 initially used to generate the electrical energy. This reversal of the chemical process creates a chemical potential energy that will later be used to generate electricity. The charging port 182 attaches to an external power source 171 from which it draws electrical energy. The diode 183 is an electrical device that allow current to flow in only one direction. The diode 183 is installed between the battery 181 and the charging port 182 such that electricity will not flow from the positive terminal 185 of the battery 181 to the charging port 182.

The external power source 171 is an externally provided source of electrical power.

In the first potential embodiment of the disclosure, the plurality of attachment devices 114 comprises plurality of magnets 151. As shown most clearly in FIGS. 2 and 3, each of the plurality of magnets 151 is an individual magnet that is attached to the second face 162 of the shell 111. The plurality of magnets 151 magnetically attach the shell 111 to the frame of the vehicle 172 such that the sentiment 126 can be visibly presented to passing vehicles by the display 121. Each of the plurality of magnets 151 are identical. It is preferred that each of the plurality of magnets 151 comprises a neodymium magnet that is covered in a neoprene or similar cushioning material. The cushioning material prevents damage to the vehicle 172 by the invention 100.

In a second potential embodiment of the disclosure, the plurality of attachment devices 114 comprises a plurality of suction cups 152. As shown most clearly in FIG. 7, each of the plurality of suction cups 152 is a readily and commercially available suction cup. Each of the plurality of suction cups 152 are identical. The plurality of suction cups 152 allow for the invention 100 to be attached to both magnetic and non-magnetic surfaces of the vehicle 172.

In a third potential embodiment of the disclosure, the selection circuit 123 comprises a commercially available programmable logic circuit. The interface 124 comprises a single switch that toggles through a collection of options presented through the display 121 by the selection circuit 123. Methods to create a programmable device as described in the third potential embodiment of the disclosure are well known and documented in the electrical arts.

The following definitions were used in this disclosure:

Anodes and Cathodes: As used in this disclosure, an anode and a cathode are the connecting terminals of an electrical circuit element or device. Technically, the cathode is the terminal through which the physical electrons flow into the device. The anode is the terminal through which the physical electrons flow out of the device. As a practical matter the anode refers to: 1) the positive terminal of a power consuming electrical circuit element; 2) the negative terminal of a discharging battery or an electrical power source; and, 3) the positive terminal of a charging battery. As a further practical matter the cathode refers to: 1) the negative terminal of a power consuming electrical circuit element; 2) the positive terminal of a discharging battery or an electrical power source; and, 3) the negative terminal of a charging battery.

Battery: As used in this disclosure, a battery is a container consisting of one or more cells, in which chemical energy is converted into electricity and used as a source of power.

Cavity: As used in this disclosure, a cavity is an empty space or negative space that is formed within an object.

Detent: As used in this disclosure, a detent is a device for positioning and holding one mechanical part in relation to another in a manner such that the device can be released by force applied to one or more of the parts.

Diode: As used in this disclosure, a diode is a two-terminal semiconductor device that allows current flow in only one direction. The two terminals are called the anode and the cathode. Electric current is allowed to pass from the anode to the cathode.

Display: As used in this disclosure, a display is a surface upon which is presented an image, potentially including, but not limited to, graphic images and text, that is interpretable by an individual viewing the projected image in a meaningful manner.

External Power Source: Refers to source of the energy that is externally provided to enable the operation of the present disclosure. Examples of external power sources include, but are not limited to, electrical power sources and compressed air sources.

Flush: As used in this disclosure, the term flush is used to describe the alignment of a first surface and a second surface on a single plane.

Form Factor: As used in this disclosure, the term form factor refers to the size and shape of an object.

Hinge: As used in this disclosure, a hinge is a device that permits the turning, rotating, or pivoting of a first object relative to a second object.

Housing: As used in this disclosure, a housing is a rigid casing that encloses and protects one or more devices.

Image: As used in this disclosure, an image is an optical representation or reproduction of a sentiment or of the appearance of something or someone.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interface: As used in this disclosure, an interface is a physical or virtual boundary that separates two different systems across which information is exchanged.

Logic Circuit: As used in this disclosure, a logic circuit is an electrical device that receives one or more digital or analog inputs and uses those digital or analog inputs to generate one or more digital or analog outputs.

Magnet: As used in this disclosure, a magnet is an ore, alloy, or other material that has its component atoms arranged so the material exhibits properties of magnetism such as attracting other iron-containing objects or aligning itself in an external magnetic field.

Maintained Switch: A used in this disclosure, a maintained switch is a switch that maintains the position that was set in the most recent switch actuation. A maintained switch works in an opposite manner to a momentary switch.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pivot: As used in this disclosure, a pivot is a rod or shaft around which an object rotates or swings.

Plug: As used in this disclosure, a plug is an electrical termination that electrically connects a first electrical circuit to a second electrical circuit or a source of electricity.

Port: As used in this disclosure, a port is an electrical termination that is used to connect a first electrical circuit to a second external electrical circuit. In this disclosure, the port is designed to receive a plug.

Sentiment: As used in this disclosure, a sentiment refers to a symbolic meaning or message that is communicated through the use of an image, potentially including a text based image.

Sign: As used in this disclosure, a sign is a placard that displays an image, potentially including a text based image, which contains some form of a sentiment.

Suction Cup: As used in this disclosure, a suction cup means an object or device that uses negative fluid pressure of air or water to adhere to nonporous surfaces by creating a partial vacuum.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Vehicle: As used in this disclosure, a motorized vehicle is a device that is used for transporting passengers, goods, or equipment. The term motorized vehicle refers to a vehicle can move under power provided by an electric motor or an internal combustion engine.

With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A portable emergency signaling device comprising:

a housing and a placard device;

wherein the placard device is contained within the housing;

wherein the portable emergency signaling device is configured for use with a vehicle;

wherein the portable emergency signaling device attaches to the vehicle;

wherein the portable emergency signaling device is a sign that presents a sentiment indicating that the vehicle requires assistance;

wherein the sentiment indicates that the vehicle requires assistance;

wherein the sentiment indicates the type of assistance the vehicle requires;

wherein the selected sentiment presented by the portable emergency signaling device is illuminated;

wherein the housing comprises a shell, a display aperture, a stand, and a plurality of attachment devices;

wherein the display aperture is formed in the shell;

wherein the stand and the plurality of attachment devices are attached to the stand;

wherein the shell comprises a first face, a second face, a third face, a fourth face, a fifth face, and a sixth face;

wherein the second face is the surface of the shell that is distal from the first face;

wherein the third face is a surface of the shell that attaches the first face to the second face;

wherein the fourth face is a surface of the shell that attaches the first face to the second face;

wherein the fifth face is a surface of the shell that attaches the first face to the second face;

wherein the sixth face is a surface of the shell that attaches the first face to the second face;

wherein the placard device is an electrical device that presents a sentiment selected from a plurality of sentiments;

wherein the shell is a rigid casing;

wherein the shell has a rectangular block structure;

wherein the display aperture is an opening formed in the shell;

wherein the sentiment is projected in a visible manner through the display aperture by the placard device;

wherein the display aperture is further formed with inner dimensions;

wherein the first face is the surface of the shell within which the display aperture is formed;

wherein the plurality of attachment devices are fastening devices that attach the portable emergency signaling device to the vehicle;

wherein the stand is an extendable structure;

wherein the stand supports the shell in such a manner that the portable emergency signaling device can be deployed in a self-standing manner;

wherein the stand comprises a cavity, an arm, a hinge, and a detent;

wherein the hinge attaches the arm to the cavity;

wherein the detent locks the arm in a fixed position relative to the cavity;

wherein the cavity is a negative space that is formed in the second face of the shell;

wherein the cavity is sized such that the arm will fit in within the cavity;

wherein the arm is a rectangular plate structure;

wherein the arm is sized such that the arm will fit in a flush manner within the cavity;

wherein the hinge is a mechanical device that attaches the arm to the second face of the shell such that the arm will rotate into and out of the cavity;

wherein the detent is a mechanical device that locks the hinge in a fixed position such that the position of the arm relative to the second face of the shell is fixed;

wherein the placard device comprises a display, an image storage device, a selection circuit, an interface, and a power system;

wherein the display, the image storage device, the selection circuit, the interface, and the power system are electrically interconnected;

wherein the display is further defined with an outer dimension;

wherein the display is an electronic device that presents an image that conveys the selected sentiment;

wherein the display is a backlit device that illuminates the selected sentiment;

wherein the inner dimension of the display aperture is lesser than the outer dimensions of the display such that the display is contained within the shell;

wherein the selection circuit is an electrical circuit that receives input signals from the interface;

wherein the selection circuit is an electrical circuit that selects a sentiment from the plurality of sentiments for presentation on the display;

wherein the image storage device is an electronic device that stores a digital representation of each sentiment contained within the plurality of sentiments;

wherein the operation of the image storage device is controlled by a device selected from the group consisting of the display or the selection circuit;

wherein the interface is an electrical device that allows for the external identification and selection of a sentiment from the plurality of sentiments;

wherein the power system is an electrical circuit that powers the operation of the placard device;

wherein the power system comprises a collection of battery, a charging port, a diode, and a master switch;

wherein the battery is a rechargeable battery;

wherein the master switch is a maintained switch that is placed in series with the positive terminal of the battery such that the master switch acts as the on off switch for the portable emergency signaling device;

wherein the charging port is an electrical circuit that reverses the polarity of the battery;

wherein the charging port attaches to an external power source;

wherein the diode is an electrical device that allow current to flow in only one direction;

wherein the diode is installed between the battery and the charging port such that electricity will not flow from the positive terminal of the battery to the charging port;

wherein the selection circuit is a non-programmable circuit;

wherein the interface comprises a plurality of display switches;

wherein the plurality of display switches comprises a collection of individual display switches;

wherein each individual display switch is an electric circuit that is individually monitored by the selection circuit;

wherein each individual display switch comprises a selection switch and a pull-down resistor;

wherein the selection switch is a maintained switch;

wherein the selection switch and the pull-down resistor form a series circuit between the positive terminal of the battery and an electrical ground;

wherein the pull-down resistor is placed between the selection switch and the electrical ground;

wherein the individual display switch is formed such that when the selection switch is closed, a voltage is presented across the pull-down resistor;

wherein the selection circuit detects the presented voltage;

wherein the selection circuit generates the appropriate output signal required to present the indicated selected sentiment on the display based on the detected voltage.

2. The portable emergency signaling device according to claim 1 wherein the plurality of attachment devices comprises a collection of plurality of magnets;

wherein each of the plurality of magnets is an individual magnet that is attached to the second face of the shell;

wherein the plurality of magnets magnetically attach the shell to the frame of the vehicle such that the sentiment can be visibly presented to passing vehicles by the display;

wherein each of the plurality of magnets are identical;

wherein each of the plurality of magnets comprises a neodymium magnet.

3. The portable emergency signaling device according to claim 2 wherein the message of a sentiment is selected the group consisting of "out of gas", "flat tire", "accident", "need jump" or "mechanical issue."

4. The portable emergency signaling device according to claim 1 wherein the plurality of attachment devices comprises a collection of plurality of suction cups;

wherein each of the plurality of suction cups are identical;

wherein the plurality of suction cups attach the portable emergency signaling device to the vehicle;

wherein the message of a sentiment is selected the group consisting of "out of gas", "flat tire", "accident", "need jump" or "mechanical issue."

5. The portable emergency signaling device according to claim 1 wherein the selection circuit comprises a programmable logic circuit;

wherein the interface comprises a single switch that toggles through a collection of options presented through the display by the selection circuit.

6. The portable emergency signaling device according to claim 5 wherein the plurality of attachment devices comprises a collection of plurality of magnets;

wherein each of the plurality of magnets is an individual magnet that is attached to the second face of the shell;

wherein the plurality of magnets magnetically attach the shell to the frame of the vehicle such that the sentiment can be visibly presented to passing vehicles by the display;

wherein each of the plurality of magnets are identical;

wherein each of the plurality of magnets comprises a neodymium magnet;

wherein the message of a sentiment is selected the group consisting of "out of gas", "flat tire", "accident", "need jump" or "mechanical issue."

7. The portable emergency signaling device according to claim 6 wherein the plurality of attachment devices comprises a collection of plurality of suction cups;

wherein each of the plurality of suction cups are identical;

wherein the plurality of suction cups attach the portable emergency signaling device to the vehicle.

8. The portable emergency signaling device according to claim 7 wherein the message of a sentiment is selected the group consisting of "out of gas", "flat tire", "accident", "need jump" or "mechanical issue."

* * * * *